United States Patent [19]
Fell et al.

[11] Patent Number: 4,719,734
[45] Date of Patent: Jan. 19, 1988

[54] WATERPROOF MEMBRANE

[76] Inventors: Leonard G. Fell; William L. K. Fell, both of 15/98 Old Pittwater Road, Brookvale New South Wales 2100, Australia

[21] Appl. No.: 910,150

[22] PCT Filed: May 31, 1985

[86] PCT No.: PCT/AU85/00115
§ 371 Date: Aug. 13, 1986
§ 102(e) Date: Aug. 13, 1986

[87] PCT Pub. No.: WO86/04106
PCT Pub. Date: Jul. 17, 1986

[30] Foreign Application Priority Data
Dec. 28, 1984 [AU] Australia .................... PG8724

[51] Int. Cl.$^4$ .................... E04D 5/10; E04D 5/12
[52] U.S. Cl. .................... 52/302; 52/309.6; 52/419; 52/420; 52/540; 52/746; 52/748

[58] Field of Search .................... 52/302, 309.6, 419, 52/420, 540, 746, 748

[56] References Cited
U.S. PATENT DOCUMENTS

| | | | |
|---|---|---|---|
| 2,125,694 | 8/1938 | Sattig | 52/540 |
| 3,135,069 | 6/1964 | Schuller et al. | 52/302 X |
| 3,483,664 | 12/1969 | Funk et al. | 52/309.6 |
| 3,505,770 | 4/1970 | Bennett | 52/540 X |
| 4,490,952 | 1/1985 | Winston | 52/302 X |
| 4,588,458 | 5/1986 | Previsani | 52/746 X |

*Primary Examiner*—Alfred C. Perham

[57] ABSTRACT

A self-adhering waterproofing membrane (1) having disposed over the adhesive face (3) thereof a vent means (2) adapted upon installation of the membrane over a substrate (4A) to release any vapor pressure which would otherwise cause blistering and said vent means being further arranged so that a sufficient portion of said adhesive face engages the substrate to enable the membrane to adhere thereto.

8 Claims, 3 Drawing Figures

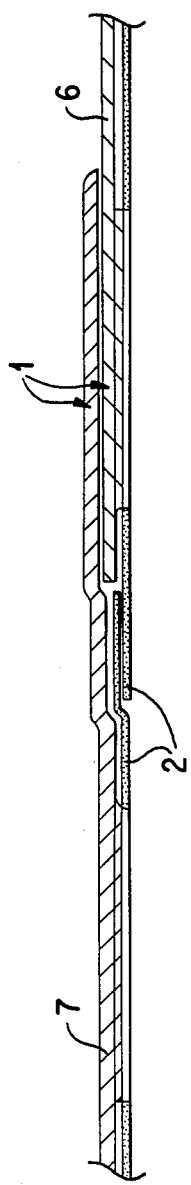
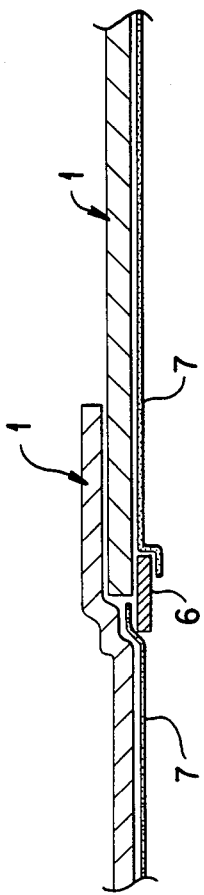
FIG. 2
FIG. 3

WATERPROOF MEMBRANE

This invention relates to building products and more particularly discloses an improved waterproofing membrane.

Existing waterproofing membranes typically consist of bitumen or rubberised asphalt compositions which are applied either directly to the substrate in a molten state or in the form of self adhesive sheets. While such membranes are more or less satisfactory where the substrate surface is below ground level and shielded from direct sunlight, in other above ground locations (such as roofing installations) where the natural moisture content of the substrate causes a buildup of vapor pressure blistering often occurs. Although these blisters can be removed by piercing the material at each point to relieve the pressure this of course requires the subsequent repair of the membrane if the moisture barrier is to be preserved.

It is therefore an object of this invention to ameliorate this disadvantage and accordingly a self adhering waterproofing membrane is disclosed which has over the adhesive face thereof a vent means adapted upon installation of the membrane over a substrate to release any vapor pressure which would otherwise cause blistering and said vent means being further arranged so that a sufficient portion of said adhesive face engages the substrate to enable the membrane to adhere thereto.

Preferably this vent means comprises sheets or strips of inorganic or organic material which are applied to the membrane during manufacture and operate to prevent the bonding of that portion of the membrane over which they extend. Although the invention is not limited to any specific composition for these sheets or strips they are preferably porous in nature and may comprise for example a polyester, fiberglass, plastic or glass based material.

Preferred embodiments of this invention will now be described with reference to the attached drawings in which:

FIG. 2 shows a cross-section of a preferred form of joint using the membrane of FIG. 1 and FIG. 3 shows a cross-section of a joint for use with an alternative form of membrane.

Figure 1:
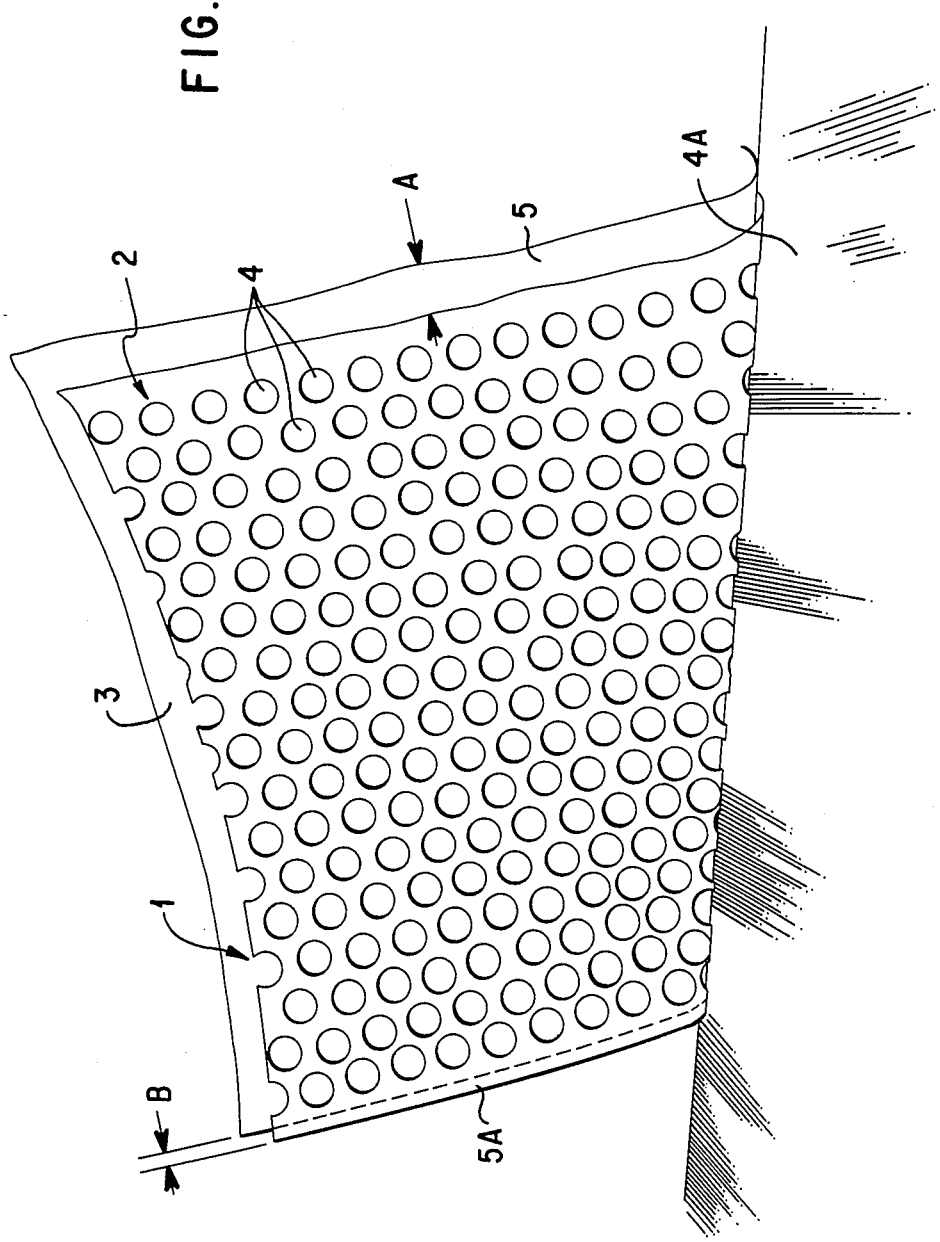
FIG. 1 shows a self adhesive membrane and vent sheet according to this invention being applied to a substrate.

Referring first to FIG. 1 the membrane may comprise a moisture proof layer 1 of a rubberised asphalt composition approximately 1.6 mm thick with a layer of spunbonded polyester 2 (such as one known in the trade as REEMAY 2400 Series) bonded to the adhesive face 3 thereof. This polyester sheet is preferably formed with a series of 50 mm diameter apertures 4 across its areas so that a substantial portion of its adhesive face 3 (with this embodiment about 85 percent) is still able to adhere to the substrate 4A over which the membrane is installed. By virtue of the porous nature of the polyester sheet however any vapor pressure which builds up after installation is vented to the edges of the membrane before blistering can occur. Such a construction also provides the advantage during initial application of the membrane of enabling any trapped air pockets to be easily dispersed to the edges of the sheet.

With this particular embodiment of the invention the membrane may be laid in the form of overlapping sections. Along one edge thereof the vent sheet is inset a distance "A" of approximately 65 mm to form a side flap 5 and along the opposite edge 5A this sheet preferably overlaps a distance "B" of about 20 mm. This arrangement enables the edges of adjoining sections 6 and 7 to conveniently interfit (as shown in FIG. 2) in such a manner that the moisture proof layers 1 and vent sheets 2 respectively overlap and preserve both both the waterproof barrier and a vapor passage across the joint. Any trapped air or vapor is thus free to migrate either along the membrane strips or across them to the perimeter of the substrate where it is released to atmosphere. Although the vent sheet 2 is also shown as being inset from the end of the membrane it may in fact be co-terminal along this edge with the moisture proof layer 1. The ends of adjacent membrane sections in this case would be arranged to abut each other and a strip of unvented membrane would be laid over the length of the joint to establish a moisture barrier.

In an alternative form of the invention it is also envisaged that the vent sheet could comprise a series of transverse strips extending across the adhesive face of the membrane. This would similarly enable migration of water vapor to the edges of the membrane while sufficient area would also be provided between adjacent strips for the adhesive face to engage the substrate. Adjacent membrane sections could in this case be coneniently joined by overlapping the moisture proof layers 1 as shown in FIG. 3 with an additional continuous vent strip 6 disposed underneath along the length of the joint. This strip would thus abut the ends of the transverse strips 7 and insure free passage of vapor across the joint.

It will thus be appreciated that this invention at least in the form of the embodiments described provides a novel and unique improvement in waterproofing membranes. Clearly however the particular examples disclosed are only the currently preferred forms of ths invention and a wide variety of modifications may be made which would be apparent to a man skilled in the art. For example the size, shape, placement, and material composition of the vent sheet or the apertures therein may be varied according to application and/or design preference. Indeed it is also contemplated that the vent means rather than being bonded to the membrane during manufacture could be arranged directly on the substrate prior to the separate application of the membrane.

We claim:

1. A self-adhering waterproofing membrane having affixed to the adhesive face thereof at least one vent sheet, adapted upon installation of the membrane over a substrate, to release any vapor pressure which would otherwise cause blistering wherein said vent sheet has a plurality of apertures arranged over the area thereof, the vent sheet being sufficiently thin and the apertures being so arranged that a sufficient portion of said adhesive face engages the substrate through said apertures to enable the membrane to adhere thereto, the remaining portion of said adhesivie face between said apertures being prevented from bonding to said substrate by the vent sheet so that ventilation of said vapor pressure is thereby provided in all directions to the edges of the membrane.

2. The self-adhering waterproofing membrane as claimed in claim 1 wherein said vent means comprises one or more vent sheets of an inorganic or organic material which operate to prevent the bonding of that portion of the membrane face over which it extends.

3. The self-adhering waterproofing membrane as claimed in claim 2 wherein said vent sheets or vent strips are porous in nature and comprise a polyester, fiberglass, plastic, or glass based material.

4. The self-adhering waterproofing membrane as claimed in claim 1 wherein said apertures cover about 85 percent of the surface area of the vent sheets.

5. The self-adhering waterproofing membrane as claimed in claim 4 wherein the vent sheet overlays said face in a manner whereby along one edge thereof said sheet is inset from the boundary of the membrane to form a flap and along the opposite edge the sheet overlaps said membrane.

6. The self-adhering waterproofing membrane as claimed in claim 1 wherein the vent means comprises one or more vent strips extending transversely across the membrane with sufficient space being provided between said strips to enable the adhesive face to engage the substrate.

7. A method of applying a self-adhering waterproofing membrane having affixed to the adhesive face thereof at least one vent sheet having a plurality of apertures arranged over the area thereof, the vent sheet being sufficiently thin and the apertures being so arranged that a sufficient portion of said adhesive face engages the substrate through said apertures to enable the membrane to adhere thereto, the remaining portion of said adhesive face between said apertures being prevented from bonding to said substrate by the vent sheet so that ventilation of said vapor pressure is thereby provided in all directions to the edges of the membrane, which comprises the step of:

laying the membrane over the substrate in the form of overlapping sections with the edges of adjoining sections interfitting in a manner whereby said vent sheets and membrane faces respectively overlap to preserve both a moisture-proof barrier and a vapor passage across the joint.

8. The method as claimed in claim 7 wherein prior to laying the membrane sections over the substrate vent sheets are disposed over the adhesive faces of each of the membrane sections in a manner whereby along one edge of each section the vent sheet is inset from the boundary of the face to form a flap and along the opposite edge the vent sheet overlaps the face.

* * * * *